US012638348B2

(12) United States Patent
Jourdan et al.

(10) Patent No.: US 12,638,348 B2
(45) Date of Patent: May 26, 2026

(54) STRAIN GAUGE

(71) Applicant: Commissariat à l'Énergie Atomique et aux Énergies Alternatives, Paris (FR)

(72) Inventors: Guillaume Jourdan, Grenoble (FR); Marc Gely, Grenobel (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 360 days.

(21) Appl. No.: 18/528,444

(22) Filed: Dec. 4, 2023

(65) Prior Publication Data

US 2024/0192067 A1 Jun. 13, 2024

(30) Foreign Application Priority Data

Dec. 8, 2022 (FR) ....................................... 2212957

(51) Int. Cl.
*G01L 1/24* (2006.01)
*G01D 5/26* (2006.01)
(52) U.S. Cl.
CPC ................ *G01L 1/24* (2013.01); *G01D 5/268* (2013.01)
(58) Field of Classification Search
CPC .................................. G01L 1/24; G01D 5/268
See application file for complete search history.

(56) References Cited

U.S. PATENT DOCUMENTS

| | | | |
|---|---|---|---|
| 6,909,824 B1 * | 6/2005 | Messica .............. | G02B 6/3536 |
| | | | 385/27 |
| 2016/0246000 A1 | 8/2016 | Duraffourg et al. | |
| 2018/0172728 A1 * | 6/2018 | Aksyuk .............. | H01J 37/3174 |

FOREIGN PATENT DOCUMENTS

| | | | | |
|---|---|---|---|---|
| CN | 103487406 B | * | 4/2016 | |
| EP | 4382875 A1 | * | 6/2024 | ............. G01D 5/268 |
| FR | 3143140 A1 | * | 6/2024 | ............. G01Q 20/04 |
| WO | WO-2015059511 A1 | * | 4/2015 | ........... G02B 6/3536 |

OTHER PUBLICATIONS

Preliminary Search Report for French Application No. 2212957, dated Jun. 13, 2023.
Banniard L., Inertial Inertial sensors with optomechanical transduction. Micro and nanotechnologies/Microelectronics. Université Grenoble Alpes, 2020, 277 pages. https://theses.hal.science/tel-03163570.
Jourdan et al., Suspended Piezoresistive Silicon Nanogauges Bridge for Mems Transduction: Spurious Signal Rejection Capability. IEEE Transducers, Jun. 21, 2015; pp. 2172-2175.
Krause et al., A microchip optomechanical accelerometer. Caltech, Physics Optics, arXiv:1203.5730v1. Mar. 2012; 16 pages.

(Continued)

*Primary Examiner* — Jamel E Williams
(74) *Attorney, Agent, or Firm* — Wolf, Greenfield & Sacks, P.C.

(57) ABSTRACT

A device including a substrate; a first layer resting on the substrate, the first layer including a first portion and a second portion mobile with respect to each other; and a ring-shaped optical resonator defined in a second layer. The resonator includes a first portion fixed to a first anchor pad connected to the first portion of the first layer and a second portion fixed to a second anchor pad connected to the second portion of the first layer.

15 Claims, 4 Drawing Sheets

(56)          References Cited

OTHER PUBLICATIONS

Mansoor et al., Optical Racetrack Resonators for Strain Sensing
Applications. IET, InTenth International Conference on Computa-
tional Electromagnetics. 2019; pp. 1-6.
Salim et al., Inkjet printed kirigami inspired split ring resonator for
disposable, low cost strain sensor applications. Smart Materials and
Structures. Nov. 29, 2019;29(1):015016.

* cited by examiner

STRAIN GAUGE

CROSS REFERENCE TO RELATED APPLICATIONS

This application claims priority to French application number 2212957, filed Dec. 8, 2022, the contents of which is incorporated by reference in its entirety.

TECHNICAL FIELD

The present disclosure generally concerns integrated circuits, and, more particularly, integrated circuits implementing a strain gauge.

PRIOR ART

Known integrated circuits comprise a piezoresistive or photonic strain gauge enabling to measure a deformation of an element, the strain gauge then being fixed to and in contact with the element having its deformation measured so that a deformation of this element causes a corresponding deformation of the gauge.

Known photonic integrated circuits provide measuring a displacement between a first element and a second element mobile with respect to each other. These circuits comprise an optomechanical strain gauge comprising an optical resonator fixed to the first element, so that a displacement of the two elements with respect to each other causes a variation (or deformation) of a mechanical space between the optical resonator and the second element, or a variation (or deformation) of an optical space between the resonator and a waveguide attached to the second element. The variation of the mechanical space causes a modification of the effective optical index of the resonator resulting from the modification of the space separating the first and second elements, and thus a corresponding and measurable variation of its resonance wavelength. The variation of the optical space, where the waveguide is optically coupled to the optical resonator, causes a corresponding and measurable modification of the optical coupling between the waveguide and the resonator.

As compared with known piezoresistive strain gauges, known optomechanical strain gauges enable not to use the electrical connections necessary to the biasing and to the deformation measurement of the piezoresistive gauge.

However, known optomechanical strain gauges, in particular those enabling to measure a relative displacement of two elements with respect to each other, have other disadvantages. For example, the forming of the mechanical space may require lithography means, hardly accessible for many founders.

It would be desirable to have a photonic device or photonic integrated circuit comprising an optomechanical strain gauge overcoming all or part of the disadvantages of known optomechanical strain gauges.

SUMMARY OF THE INVENTION

An embodiment overcomes all or part of the disadvantages of known devices comprising a known optomechanical strain gauge to measure a relative displacement between two elements mobile with respect to each other.

An embodiment provides a device comprising:

a substrate;

a first layer resting on the substrate, the first layer comprising a first portion and a second portion mobile with respect to each other;

a ring-shaped optical resonator defined in a second layer, the resonator comprising a first portion fixed to a first anchor pad connected to the first portion of the first layer and a second portion fixed to a second anchor pad connected to the second portion of the first layer.

According to an embodiment, the first and second anchor pads are arranged inside of the resonator.

According to an embodiment, the first and second portions of the resonator each have a semi-circle shape.

According to an embodiment:

the first pad has the shape of a half-disk having its center forming one with the center of the first portion of the resonator and its curved portion facing the first portion of the resonator; and/or the second pad has the shape of a half-disk having its center forming one with the center of the second portion of the resonator and its curved portion facing the second portion of the resonator.

According to an embodiment:

the first portion of the resonator is fixed to the first pad by first beams defined in the second layer, each of the first beams having a first end connected to the resonator and a second end connected to the first pad; and/or the second portion of the resonator is fixed to the second pad by second beams defined in the second layer, each of the second beams having a first end connected to the resonator and a second end connected to the second pad.

According to an embodiment, each of the first and second beams has a larger cross-section area on the side of its second end than on the side of its first end.

According to an embodiment:

the first portion of the resonator is fixed to the first pad by a first continuous portion of the second layer, the assembly of the first portion of the resonator, of the first portion of the second layer, and of the first pad having the shape of a half-disk; and/or the second portion of the resonator is fixed to the second pad by a second continuous portion of the second layer, the assembly of the second portion of the resonator, of the second portion of the second layer, and of the second pad having the shape of a half-disk.

According to an embodiment:

the first portion of the resonator is bonded to the first pad by a first portion of the second layer, the assembly of the first portion of the resonator, of the first portion of the second layer, and of the first pad having the shape of a half-disk, and the first portion of the second layer comprises through openings configured to favor a single optical propagation mode in the first portion of the resonator; and/or the second portion of the resonator is bonded to the second pad by a second portion of the second layer, the assembly of the second portion of the resonator, of the second portion of the second layer, and of the second pad having the shape of a half-disk, and the second portion of the second layer comprises through openings configured to favor a single optical propagation mode in the second portion of the resonator.

According to an embodiment, the resonator comprises a third portion coupling the first portion of the resonator to the second portion of the resonator, and another third portion coupling the second portion of the resonator to the first portion of the resonator, the assembly of the first, second, and third portions forming the ring of the resonator.

According to an embodiment, each of the first and second portions of the resonator has a cross-section configured to allow a multimode guiding of light, and each of the third portions has a central portion having a cross-section configured to allow a monomode guiding of light.

According to an embodiment, the first and second portions of the first layer are mobile with respect to each other in a first direction parallel to the substrate.

According to an embodiment, the second layer is arranged between the substrate and the first layer, the first and second portions of the first layer being suspended above the substrate.

According to an embodiment, the device further comprises a waveguide defined in the second layer and having a portion optically coupled to the resonator, said portion of the waveguide being either optically coupled to the first portion of the resonator and fixed to the first portion of the first layer, or optically coupled to the second portion of the resonator and fixed to the second portion of the first layer.

According to an embodiment:
the first portion of the first layer is fixed with respect to the substrate;
the first layer further comprises a third portion suspended above the substrate and mobile with respect to the substrate in a plane parallel to the substrate; and
the device comprises a lever arm, for example at least partly defined in the first layer, configured so that a displacement of the third portion with respect to the substrate in said plane parallel to the substrate causes a corresponding displacement of the second portion of the first layer with respect to the first portion of the first layer in said plane parallel to the substrate.

According to an embodiment:
the first portion of the first layer is fixed with respect to the substrate;
the first layer further comprises a third portion suspended above the substrate and rotatably mobile around an axis parallel to the substrate; and
the device comprises a lever arm, for example partly defined in the first layer, configured so that a rotation of the third portion around said axis causes a corresponding displacement of the second portion of the first layer with respect to the first portion of the first layer in a plane parallel to the substrate.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DESCRIPTION OF EMBODIMENTS

Figure 1:
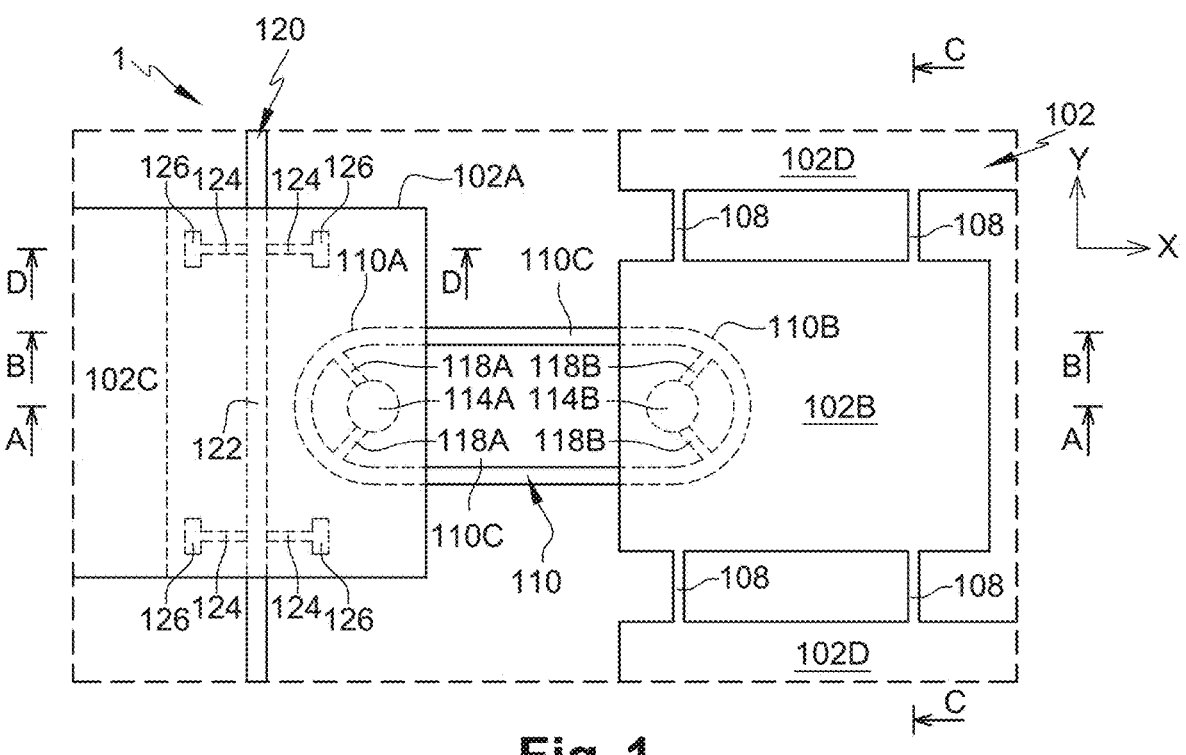
FIG. 1 shows, in a simplified top view, an example of an embodiment of a device.

For the sake of clarity, only the steps and elements that are useful for the understanding of the described embodiments have been illustrated and described in detail. In particular, the methods of manufacturing the photonic circuits described herein have not been detailed, the manufacturing of the embodiments and variants of these photonic circuits based on usual known photonic circuit manufacturing steps being within the abilities of those skilled in the art based on the following description.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms "edge", "back", "top", "bottom", "left", "right", etc., or relative positions, such as terms "above", "under", "upper", "lower", etc., or to terms qualifying directions, such as terms "horizontal", "vertical", etc., it is referred, unless specified otherwise, to the orientation of the drawings.

Unless specified otherwise, the expressions "about", "approximately", "substantially", and "in the order of" signify plus or minus 10%, preferably of plus or minus 5%.

There is here provided a device comprising a substrate, a first layer indirectly resting on the substrate, and a ring-shaped optical resonator defined in a second layer, where the first layer comprises a first portion and a second portion configured to be mobile with respect to each other, for example in a direction parallel to the substrate, and where the resonator has a first portion fixed to the first portion of the first layer and a second portion fixed to the second portion of the second layer.

Thus, when the first and second portions of the first layer displace with respect to each other, for example in the above-mentioned direction, portions of the resonator which couple the first and second portions of the resonator to form the resonator ring deform, for example are compressed or extend in the above-mentioned direction. These deformations of the ring cause a corresponding modification of its resonance wavelength. By measuring the variation of the resonance wavelength of the ring, it is possible to know, and thus to measure, the relative displacement of the first and second portions of the first layer with respect to each other.

Unless indicated otherwise, when reference is made to an element anchored, fixed, attached, or hooked to the first layer, this means that this element is mechanically coupled to the first layer, and that this element is mechanically coupled to the substrate via the first layer. For example, in other words, this means that the mechanical coupling between this element and the first layer is shorter (or more direct) than each mechanical coupling that this element has with the substrate.

Symmetrically, unless indicated otherwise, when reference is made to an element anchored, fixed, attached, or hooked to the substrate, this signifies that this element is mechanically coupled to the substrate, and that this element is mechanically coupled to the first layer via the substrate. For example, in other words, this means that the mechanical coupling between this element and the substrate is shorter (or more direct) than each mechanical coupling that this element has with the first layer.

Examples of embodiments and of alternative embodiments of such a device will now be described in relation with FIGS. 1 to 10.

Figure 2:
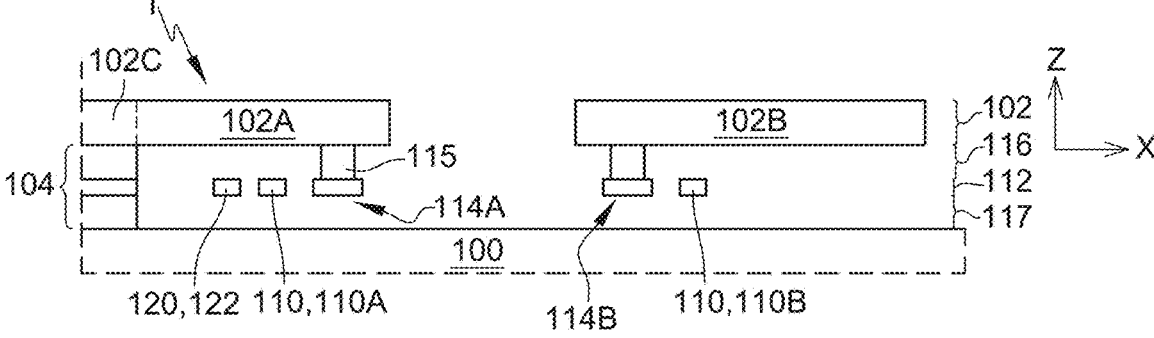
FIG. 2 shows a simplified cross-section view taken in plane AA of FIG. 1.
Figure 3:
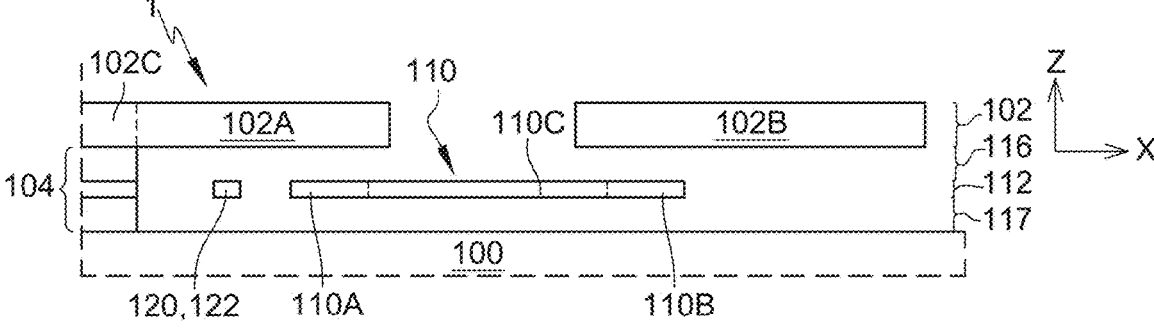
FIG. 3 shows a simplified cross-section view taken in plane BB of FIG. 1.

FIG. 1 shows, in a simplified top view, an example of an embodiment of such a device 1. FIG. 2 is a simplified cross-section view of device 1 taken in plane AA of FIG. 1, FIG. 3 being a simplified cross-section view of device 1 taken in plane BB of FIG. 1, FIG. 4 being a simplified cross-section view of device 1 taken in plane CC of FIG. 1, and FIG. 5 being a simplified cross-section view of device 1 taken in plane DD of FIG. 1.

Device 1 comprises a substrate 100, for example a semiconductor substrate. In other words, circuit 1 is formed on substrate 100. As an example, substrate 100 has a thickness of several hundreds of micrometers, for example a thickness of at least 200 μm. As an alternative example, substrate 100 may have been thinned and have a thickness smaller than 200 μm.

Device 1 further comprises a layer 102. As an example, the thickness of layer 102 is smaller than 100 μm, for example smaller than 10 μm, or even smaller than 1 μm.

Layer 102 comprises a portion 102A and a portion 102B. Preferably, each of the two portions 102A and 102B is suspended above substrate 100, that is, a free space is created between substrate 100 and each of these portions 102A and 102B. Portions 102A and 102B are mobile with respect to each other, preferably in a direction parallel to substrate 100. In the example of FIGS. 1 to 5, the two portions 102A and 102B are mobile with respect to each other in a direction X, parallel to substrate 100.

As an example, one of portions 102A and 102B is fixed with respect to the substrate and the other of portions 102A and 102B is mobile with respect to substrate 100, so that portions 102A and 102B are mobile with respect to each other. As an alternative example, the two portions 102A and 102B are mobile with respect to substrate 100, so that the two portions 102A and 102B are mobile with respect to each other.

As an example, when a portion 102A or 102B of layer 102 is fixed with respect to substrate 100, this signifies that this portion of layer 102 is mechanically connected to another portion of layer 102 which is fixed to the substrate by a stack of layers in contact two by two, this stack being connected on the one hand to the substrate and on the other hand to this other portion of layer 102.

Further, when a portion 102A or 102B is mobile with respect to substrate 100, this signifies that this portion of layer 102 is mechanically coupled to another portion of layer 102 which is fixed to the substrate, for example by a stack of layers in contact two by two. This stack is connected on the one hand to the substrate and on the other hand to this other portion of layer 102. Further, the mechanical coupling of mobile portion 102A or 102B to this other portion of layer 102 which is fixed to the substrate is implemented by deformable connections. Preferably, each deformable connection corresponds to, or comprises, a portion of layer 102. As an alternative example, each deformable connection corresponds to, or comprises, a portion of another layer than layer 102, layer 102 resting on this other layer or this other layer resting on layer 102.

In the specific example of FIGS. 1 to 5, portion 102A is fixed with respect to substrate 100 and portion 102B is mobile with respect to substrate 100, and thus with respect to portion 102A, for example in the X direction.

For example, portion 102A of layer 102 is mechanically connected to a portion 102C of layer 102, portion 102C being fixed to substrate 100 by a stack 104 of layers. Stack 104 is mechanically connected to substrate 100 and to portion 102C of layer 102. In FIGS. 1, 2, 3, and 5, the limit between portion 102A and portion 102C of the layer 102 is shown by a dotted line.

Figure 4:
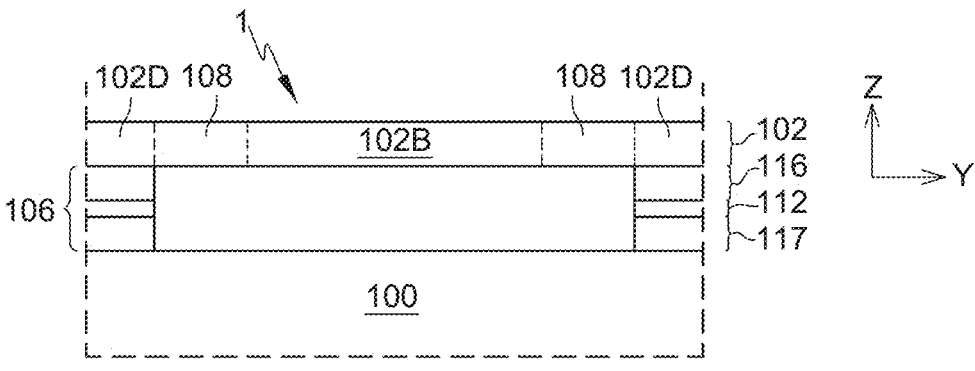
FIG. 4 shows a simplified cross-section view taken in plane CC of FIG. 1.

For example, portion 102B of layer 102 is coupled to a portion 102D of layer 102, portion 102D being fixed to substrate 100 by a stack 106 of layers. Stack 106 is, for example, identical to stack 104, with the difference that stack 106 is mechanically connected to substrate 100 and to portion 102D of layer 102 instead of being mechanically connected to substrate 100 and to portion 102C of layer 102. Further, portions 102B and 102D of layer 102 are mechanically coupled to each other by deformable couplings 108, for example couplings 108 deformable in the X direction. Couplings 108 each comprise, for example, a portion of layer 102. For example, each coupling 108 is a corresponding portion of layer 102. In FIG. 4, the limits between portion 102B and couplings 108 on the one hand, and between couplings 108 and portion 102D on the other hand are shown in dotted lines.

In the example of FIGS. 1 to 5, each coupling 108 corresponds to a beam, for example defined in layer 102, each beam having an end connected to portion 102D of layer 102 and another end connected to portion 102B of layer 102. In other examples not illustrated, each coupling 108 corresponds to one or a plurality of meanders, for example defined in layer 102. Those skilled in the art will be capable of providing other shapes for couplings 108.

Device 1 further comprises a ring-shaped optical resonator 110. As an example, the resonator has the shape of a racetrack, that is, of a ring comprising two semi-circle portions coupled together by two rectilinear portions.

Resonator 110 is formed in, or defined in, a layer 112. In other words, resonator 110 is implemented by a portion of layer 112. Layer 112 is made of a material adapted to guiding light at the operating wavelengths of circuit 1. For example, layer 112 is made of silicon, of silicon nitride, of arsenic gallium, or of germanium.

According to an embodiment, as illustrated inn FIGS. 1 to 5, layer 112 is arranged between substrate 100 and layer 102. In this case, stack 104 and/or stack 106 may comprise a portion of layer 112. In FIG. 1, the elements, particularly the portions of layer 112, arranged under layer 102 are delimited by dotted lines.

In an alternative embodiment not detailed and not illustrated, layer 112 is arranged above layer 102, layer 102 being itself arranged above substrate 100.

Layer 112 is separated from layer 102 by a single layer 116.

Resonator 110 comprises a first portion 110A fixed to portion 102A of layer 102, and a second portion 110B fixed to portion 102B of layer 102. More exactly, portion 110A of resonator 110 is fixed to an anchor pad 114A which is mechanically connected to portion 102A of layer 102, and portion 110B of resonator 110 is fixed to an anchor pad 114B which is mechanically connected to portion 102B of layer 102. Portion 110A preferably corresponds to one of the two semi-circle portions of the ring 110, portion 110B preferably corresponding to the other one of the two semi-circle portions of ring 110.

Preferably, resonator 110 is not fixed to substrate 100, that is, it is not fixed to an anchor pad connected to substrate 100.

Preferably, device 1 only comprises two pads 114A and 114B enabling to fix resonator 110 to layer 102.

Between the two portions 110A and 110B, the resonator comprises two portions 110C, for example rectilinear, each coupling portion 110A to portion 110B so that the assembly of portions 110A, 110B, and 110C placed end-to-end forms the ring of resonator 110. Preferably, when portions 110C are rectilinear, they are aligned with direction X of displacement of portions 102A and 102B with respect to each other. In other examples, these portions 110C may be non-rectilinear, for example comprise one or a plurality of curves, although they are preferably each substantially aligned lengthwise with the X displacement direction.

When the two portions 102A and 102B of layer 102 displace with respect to each other, this deforms, for example stretches or compresses, the portions 110C of resonator 110, which causes a variation of its resonance wavelength. The portions 110C of resonator 110 thus here act as an optomechanical strain gauge.

Portion 110A, respectively 110B, of resonator 110 is fixed to pad 114A, respectively 114B, by one or a plurality of portions of layer 112 each extending from portion 110A, respectively 110B, to pad 114A, respectively 114B.

Preferably, the anchor pads 114A, 114B fixing resonator 110 to layer 102 are arranged inside of ring 110, that is, in top view, pads 114A, 114B are arranged in a region laterally delimited by the inner edge of ring 114. Thus, each portion of layer 112 which fixes resonator 110 to a pad 114A or 114B is in contact with the inner edge of resonator 110 rather than with the outer edge of resonator 110, which enables to limit optical losses in resonator 110.

Each pad 114A, 114B comprises, for example, a portion of layer 112 and a region 115 extending from this portion of layer 112 all the way to layer 102. In other words, in each pad 114A, 114B, region 115 is mechanically connected to layer 102 and to the portion of layer 112 forming part of the pad. As an example, each region 115 corresponds to a portion of layer 116. As an alternative example, each region 115 is made of a material different from that of layer 116, so that layer 116 can be selectively etched over this material.

In an embodiment where layer 112 is arranged between substrate 100 and layer 102, layer 112 is separated from substrate 100 by a single layer 117. In such an embodiment, each stack 104, 106 can then comprise a portion of layer 116 and a portion of layer 117 between which may be arranged a portion of layer 112. Further, in such an embodiment, resonator 110 is then suspended under a plane comprising the surface of layer 102 which faces substrate 100, and above a plane comprising the surface of substrate 100 which faces layer 102. More generally speaking, resonator 110 is then suspended to layer 102, between layer 102 and the substrate.

In an alternative embodiment (not illustrated) where layer 112 is arranged above layer 102, resonator 110 is suspended above layer 102. In such a variant, when portion 102A or 102B is fixed with respect to substrate 100, this portion of layer 102 may be fixed to the substrate by a stack 104 of layers in contact two by two rather than first being mechanically connected to another portion of layer 102 which is fixed to substrate 100 by a stack 104 of layers. The portion 102A or 102B of layer 102 which is fixed with respect to the substrate is then not suspended above substrate 100.

According to an embodiment, as illustrated in FIG. 1, in top view, the shape of each pad 114A, 114B is substantially that of a disk.

According to an embodiment, as illustrated in FIG. 1, portion 110A respectively 110B, of resonator 110 is fixed to pad 114A, respectively 114B, by beams 118A, respectively 118B, defined in layer 112. In other words, portion 110A respectively 110B, of resonator 110 is fixed to pad 114A, respectively 114B, by portions 118A, respectively 118B, of layer 112, each portion 118A, 118B having the shape of a beam. Each beam 118A, respectively 118B, has an end connected to portion 110A, respectively 110B, of resonator 110, and another end connected to pad 114A, respectively 114B.

According to an embodiment, each beam 118A, 118B has a substantially constant cross-section area along its entire length. According to an alternative embodiment, each beam 118A, 118B has a smaller cross-section area at its end connected to resonator 110 than at its end connected to the pad.

According to an embodiment, portions 110A, 110B, and 110C of resonator 110 each have a cross-section configured to allow a monomode guiding of light in resonator 110. As a variant, portions 110A and 110B may have a cross-section configured to allow a multimode guiding of light, and at least a central portion of each of portions 110C has a cross-section configured to a monomode guiding of light. In such a variant, those skilled in the art are capable of ensuring a progressive transition from the dimensions of the cross-section of portions 110A and 110B to the dimensions of the cross-section of the central portions of portions 110C, to ensure a progressive variation of the effective optical index between these portions.

So that light propagates in resonator 110, device 1 further comprises a waveguide 120. Waveguide 120 is, like resonator 110, defined in layer 112, that is, it corresponds to, or is formed by, a portion of layer 112. Waveguide 120 comprises a portion 122 which is optically coupled to resonator 110.

For example, portion 122 of waveguide 120 is coupled to portion 110A of resonator 110 and is then fixed to portion 102A of layer 102 as illustrated in the example of FIGS. 1 to 5. As an alternative example, portion 122 of waveguide 120 is optically coupled to portion 110B of resonator 110 and is then fixed to portion 102B of layer 102. The fact that portion 122 of waveguide 120 is fixed to the same portion 102A or 102B as the portion 110A or 110B of the resonator with which portion 122 is optically coupled enables to keep constant the optical coupling space between waveguide 120 and resonator 110.

Preferably, portion 122 of waveguide 120 longitudinally extends in a direction Y parallel to substrate 100 and orthogonal to the X direction.

Preferably, when one of portions 102A and 102B of the layer 102 is fixed with respect to substrate 100, portion 122 of waveguide 120 is fixed to this portion fixed with respect to the substrate, to avoid deformations of waveguide 120 during a relative motion of portions 102A and 102B with respect to each other.

Portion 122 of waveguide 120 is fixed to layer 102 by holding arm 124 and anchor pads 126.

Pads 126 are, for example, similar to pads 114A, 114B, that is, they comprise similar stacks of portions of layers and are each mechanically connected to layer 102. For example, each pad 126 comprises a portion of layer 112 and a region 115 corresponding to a portion of layer 116 or to a material over which layer 116 can be selectively etched, region 115 being connected to this portion of layer 112 and to layer 102.

Each holding arm 124 is, for example, a portion of layer 112 extending from portion 122 of waveguide 120 to a corresponding pad 126, that is, a portion of layer 112 having an end connected to portion 122 of waveguide 120 and an end connected to this pad 126. In the example of FIGS. 1 to 5, arms 124 each have the shape of a beam although, in other examples not illustrated, each arm 124 may correspond to a plurality of beams placed end-to-end to form at least a meander or may still have other shapes.

Figure 5:
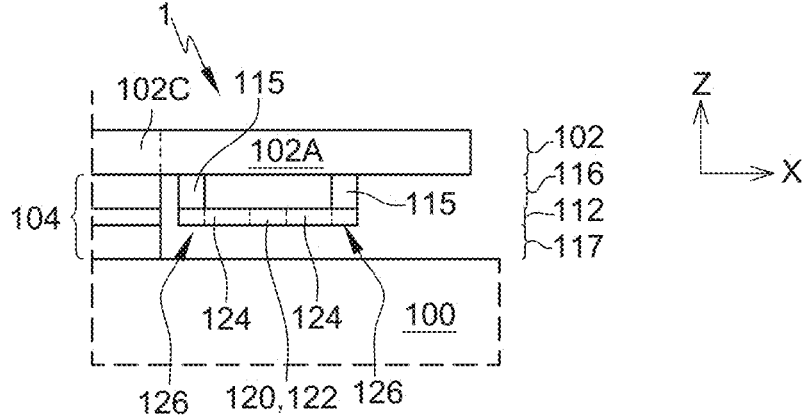
FIG. 5 shows a simplified cross-section view taken in plane DD of FIG. 1.

In FIG. 5, the limit between portion 122 of waveguide 120 and each arm 124, and the limit between each arm 124 and the portion of layer 112 of the pad 126 to which this arm is connected are shown in dotted lines.

In an embodiment where layer 112 is arranged between layer 102 and substrate 100, portion 122 of waveguide 120 is, like resonator 110, suspended to layer 102, between layer 102 and substrate 100.

In an alternative embodiment (not illustrated) where layer 112 is arranged above layer 102, waveguide 120 is, like resonator 110, suspended above layer 102.

As an example, during the manufacturing of circuit 1 in the case where layer 112 is arranged between layer 102 and substrate 100, layer 112 initially rests on layer 117, itself resting on substrate 100. Then, different elements, including resonator 110, are defined by etching in layer 112. At this step of etching of layer 112, a portion of layer 112 may be left in place at the location of each stack 104, 106, so that this stack comprises this portion of layer 112. Then, layer 116 is formed over the assembly, after which layer 102 is formed, by deposition or by transfer, on layer 116. The region 115 of each anchor pad 114A, 114B, 126 may be made of the same material as layer 102 by providing an opening in layer 116 all the way to layer 112, and then filling the opening with the material of layer 102 during the deposition of this layer 102. Alternatively, the region 115 of each anchor pad 114A, 114B, 126 may be made of a material other than that of layer 102 and that of layer 116 by providing an opening in layer 116 all the way to layer 112, and by filling the opening with this material prior to the forming of layer 102. Alternatively, the region 115 of each anchor pad 114A, 114B, 126 may correspond to a portion of layer 116. Once layer 102 has been formed on layer 116, portions of layer 102 are removed during an etch step, after which portions of layers 116 and 117 are removed by sacrificial etching selective over layers 102 and 112 and over substrate 100 to obtain circuit 1. As an example, when regions 115 are made of a material different from that of layer 116, the etching(s) of layers 116 and 117 are also selective over the material of regions 115. As an alternative example, when regions 115 are portions of layer 116, during the etching of layer 116, those skilled in the art are capable of providing openings in layer 102 and/or in layer 112 so that by controlling the etch time of layer 116 and/or of layer 117, regions 115 are left in place at the end of the etching. In this last case, in each pad 114A, 114B, and 126, region 115 may be slightly recessed with respect to the outer edge of the pad.

In the example of manufacturing method described hereabove, when layer 112 is a semiconductor layer, for example made of silicon, and layer 117 is an insulating layer, for example made of silicon oxide, layer 112 may correspond to the semiconductor layer of a structure of semiconductor-on-insulator (SOI) type formed on substrate 100.

In the example of manufacturing method described hereabove, in circuit 1, each stack 104, 106 comprises a portion left in place of layer 117, and may or not comprise a portion left in place of layer 116. Indeed, it is possible to remove layer 116 from the stack by providing for layer 102 to be formed by deposition, directly in contact with layer 112 at the location of the stack, layer 102 then being, for example, planarized.

As an alternative example, during the manufacturing of circuit 1 in the case where layer 112 is arranged between layer 102 and substrate 100, layer 102 corresponds to a portion of a first substrate, for example semiconductor, for example made of silicon, layer 116 then resting on this first substrate and layer 112 then resting on layer 116. In the same way as previously, elements, including resonator 110, are formed in layer 112. A filling material, for example identical to the material of layer 116, is deposited and then planarized, stopping before or on layer 112. Substrate 100 coated with layer 117 is then transferred onto the structure before thinning the first substrate to only leave layer 102 thereof. The next steps to obtain circuit 1 are then similar to what has been described for the other above example.

In this other example of manufacturing method, when layer 112 is a semiconductor layer, for example made of silicon, and layer 116 is an insulating layer, for example made of silicon oxide, layer 112 may correspond to the semiconductor layer of a structure of semiconductor-on-insulator (SOI) type formed on the first substrate.

Of course, the two ways of manufacturing circuit 1 which are described hereabove are examples only, and those skilled in the art are capable, based on the present description, to provide other methods of manufacturing circuit 1 by using steps which are each usual in the manufacturing of photonic circuits. In particular, those skilled in the art are capable of providing manufacturing methods enabling to manufacture circuit 1 in the case where layer 112 is arranged above layer 102.

Preferably, circuit 1 comprises a single layer 116 and a single layer 117. However, layer 116 may correspond to a plurality of layers staked on one another and/or layer 117 may correspond to a plurality of layers stacked on one another.

As an example, two sacrificial layers 116 and 117 are made of a same material, selectively etchable over the material(s) of layers 102 and 112, of substrate 100, and, for example, of each region 115. However, in other examples, layers 116 and 117 may be made of different materials, each selectively etchable over the material(s) of layers 102 and 112, of substrate 100, and, for example, of each region 115.

As an example, substrate 100 is made of silicon or of arsenic-gallium.

As an example, layer 117 is a layer of silicon oxide or a photonic polymer such as for example BCB (benzocyclobutene).

As an example, layer 116 is a silicon oxide layer.

As an example, each region 115 is made of silicon, of silicon nitride, or of silicon oxide.

Of course, those skilled in the art are capable of adapting the materials of layers 116, 112, 117, and 102, of substrate 100 and, for example, of regions 115 while keeping the previously indicated etch selectivities.

As an example, the thickness of layer 112 is in the range from 40 to 1000 nm, for example from 50 to 500 nm.

As an example, the thickness of layer 116 is greater than 500 nm, so that layer 102 does not modify the optical properties of resonator 110.

As an example, the thickness of layer 117 is greater than 500 nm so that substrate 100 is sufficiently distant from resonator 110 not to modify its optical properties.

Of course, those skilled in the art are capable of adapting the thicknesses of the layers 116, 112, 117, and 102, of substrate 100.

As an example, when device 1 is at rest (no relative motion between portions 102A and 102B of layer 102), there is called Lg the length of each of portions 110C, Ltot the total length of resonator 110, n the effective optical index in portions 110C, and λ the resonance wavelength of resonator 110. During a relative motion of portions 102A and 102B with respect to each other, portions 110C accordingly deform, which results in a variation DLg of the length of each of portions 110C and a variation Dn of the effective optical index in these portions 110C. This translates as a modification Dλ of the resonance wavelength of resonator 110. Considering that portions 110A and 110B are not deformed, the above parameters are linked to one another by the following equation:

$$Dλ/λ = A*((DLg/Lg)+(Dn/n)), \text{ with } A \text{ a form factor equal to } 2*Lg/Ltot.$$

The device 1 described herein enables to obtain dynamic measurement ranges having extents, or widths, or amplitudes, greater than those of known strain gauges. For example, for a device 1 operating in open loop, that is, with no control of the wavelength of the light delivered to waveguide 120 on the resonance wavelength of resonator 110, for a measurement bandwidth equal to 10 KHz and set by the readout electronic circuits, and a laser having relative noise with an intensity in the order of $10^{-8}$, the dynamic measurement range may be greater than $10^6$, although the bandwidth provided by the optical cavity of device 1, equal to V/Q with Q the quality factor of resonator 110, is higher. Although it has been indicated hereabove that device 1 operates in open loop, those skilled in the art are capable of providing a control of the wavelength of the light circulating through waveguide 120 on the wavelength of resonator 110 when this resonance wavelength varies as a result of a displacement of the two portions 102A and 102B of layer 102 with respect to each other.

Further, the optical measurement bandwidth is significant, for example of from a GHz to 100 GHz, although it is in practice limited by the mechanical response of the system. As a comparison, a piezoresistive gauge has a much smaller measurement bandwidth limited by the product of the gauge resistance by the gauge capacitance (RC product).

Further, device 1 has a noise threshold for the reading of the deformation of the resonator which is very low as compared with the read noise threshold of usual strain gauges.

In device 1, portion 122 of waveguide 120 is fixed to layer 102. The fact for this portion 122 of waveguide 120 to be fixed to portion 102A of layer 102 when portion 122 is optically coupled to portion 110A of the resonator, or to portion 102B of layer 102 when portion 122 is optically coupled to portion 110B of resonator 110, enables to keep constant the optical space between waveguide 120 and resonator 110 where the optical coupling of waveguide 120 with resonator 110 is performed. Although this is not claimed herein, portion 122 of the waveguide could be fixed to substrate 100 rather than to layer 102, but in this case the above-mentioned advantage of keeping constant the optical coupling space between waveguide 120 and resonator 110 would be lost, which might alter the measurement.

Figure 6:
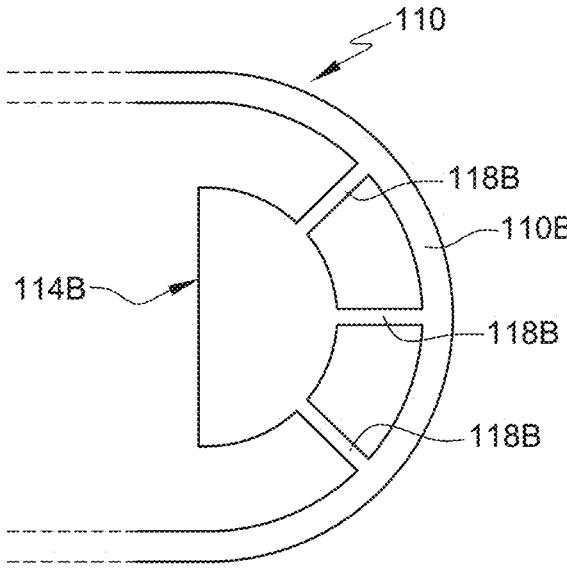
FIG. 6 shows, in a partial and simplified top view, an alternative embodiment of a portion of the device of FIGS. 1 to 5.

FIG. 6 shows, in a partial and simplified top view, an alternative embodiment of a portion of the device 1 of FIGS. 1 to 5, and, more particularly of the pads 114A, 114B of device 1. In FIG. 6, only portion 110B of resonator 110, pad

114B, and arms 118B have been shown, the description of these elements being directly transposable to portion 110A of resonator 110, to pad 114A, and to arms 118A. Only the differences between the embodiment described in relation with FIGS. 1 to 5 and the alternative embodiment of FIG. 6 are here described.

In this variant, pad 114B has, in top view, the shape of a half-disk rather than that of a disk as has been described in relation with FIGS. 1 to 5. The center of half-disk 114B, that is, of a disk which would be formed by half-disk 114B and another half-disk, is one with the center of semi-circle portion 110B, that is, the center of a circle which would be formed by semi-circle portion 110B and another semi-circle portion. Further, the curved portion of half-disk 114B faces portion 110B of the resonator, or, more exactly, the entire curved edge of pad 114B is, in a plane parallel to substrate 100, in front of portion 110B of resonator 110.

Figures 7, 8, 9:
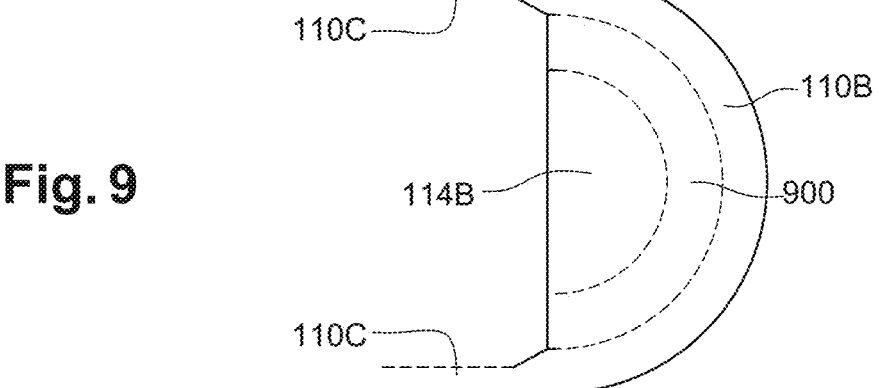
FIG. 7 shows, in a partial and simplified top view, another alternative embodiment of a portion of the device of FIGS. 1 to 5.
FIG. 8 shows, in a partial and simplified top view, still another alternative embodiment of a portion of the device of FIGS. 1 to 5.
FIG. 9 shows, partial and simplified top view, still another alternative embodiment of a portion of the device of FIGS. 1 to 5.

FIG. 7 shows, in a partial and simplified top view, another alternative embodiment of a portion of the device 1 of FIGS. 1 to 5, and, more particularly of the arms 118A, 118B of device 1. In FIG. 7, only portion 110B of resonator 110, pad 114B, and arms 118B have been shown, the description of these elements being directly transposable to portion 110A of resonator 110, to pad 114A, and to arms 118A. Only the differences between the alternative embodiment described in relation with FIG. 6 and the alternative embodiment of FIG. 7 are here described.

In this variant, arms 118B are beams defined in layer 112. However, instead of having a constant cross-section area along its entire length, each beam 118B has a larger cross-section area on the side of pad 114B than on the side of portion 110B of resonator 110. For example, each beam 118B has, on the side of its end connected to pad 114B, a cross-section area which increases towards pad 114B.

This alternative embodiment applies to cases where pad 114B has a shape other than that of a half-disk, for example the shape of a disk.

The provision of beams 118B having larger cross-section areas on the side of pad 114B than of portion 110B of resonator 110 enables to increase the stiffness of beams 118B without increasing optical losses in resonator 110 with respect to the case of beams 118B which would have constant cross-section areas along their entire lengths.

FIG. 8 shows, in a partial and simplified top view, still another alternative embodiment of a portion of the device 1 of FIGS. 1 to 5, and, more particularly of the way in which portions 110A and 110B are fixed to the respective pads 114A and 114B by portions of layer 112. In FIG. 8, only portion 110B of resonator 110, pad 114B, and a portion 800 of layer 112 fixing portion 110B to pad 114B have been shown, the description of these elements being directly transposable to portion 110A of resonator 110, to pad 114A, and to a portion of layer 112 fixing portion 110A to pad 114A.

Only the differences between the alternative embodiment described in relation with FIG. 6 and the alternative embodiment of FIG. 8 are here described.

More particularly, in this variant, instead for portion 110B of resonator 110 to be fixed to pad 114B by arms 118B defined in layer 112, portion 110B of resonator 110 is fixed to pad 114B by a portion 800 of layer 112.

Portion 800 of layer 112 fills the space between pad 114B and the semi-circle portion 110B of resonator 110. In this example where pad 114 has the shape of a half-disk, the assembly of portion 110B of resonator 110, of portion 800 of layer 112, and of pad 114B, and, more particularly, of the portion of layer 112 forming part of pad 114B, forms a half-disk.

Portion 800 of layer 112 is provided with a plurality of through openings 802, that is, openings 802 crossing layer 112 across its entire thickness. In FIG. 8, only one opening 802 is referenced to avoid overloading the drawing. Openings 802 are for example configured to implement a photonic crystal structure in portion 800. As an alternative example, part of openings 802 implements a photonic crystal structure and another part of openings 802 enables to generate high propagation losses on optical modes propagated in portion 800 and which are desired to be suppressed, that is, filtered. The photonic crystal structure is configured so that the light guided in resonator 110 remains confined in resonator 110, and, more particularly, in portion 110B of resonator 110 when it propagates through this portion 110B. In other words, portion 800 and openings 802 are configured to favor a single optical propagation mode in portion 110B.

This alternative embodiment applies to cases where pad 114B have another shape than that of a half-disk, for example the shape of a disk.

FIG. 9 shows, in a partial and simplified top view, still another alternative embodiment of a portion of the device 1 of FIGS. 1 to 5, and, more particularly of the way in which portions 110A and 110B are fixed to respective pads 114A and 114B by portions of layer 112. In FIG. 9, only portion 110B of resonator 110, pad 114B, and a portion 900 of layer 112 fixing portion 110B to pad 114B have been shown, the description of these elements being directly transposable to portion 110A of resonator 110, to pad 114A, and to a portion of layer 112 fixing portion 110A to pad 114A.

Only the differences between the alternative embodiment described in relation with FIG. 8 and the alternative embodiment of FIG. 9 are here described.

More particularly, in this variant, portion 800 of layer 112 is replaced with a portion 900 of layer 112 identical to portion 800, with the difference that it does not comprise openings 802.

In this variant, the propagation of light in portion 110B is multimode, portion 110B then having a larger cross-section area than that of the central portions 110C of the resonator, which is adapted to a monomode propagation. Preferably, as illustrated in FIG. 9, a progressive transition of the dimensions of the cross-section of portion 110B towards the dimensions of the cross-section of the central portions of portions 110C may be provided, to ensure a progressive variation of the effective optical index between these portions.

In the different embodiments and alternative embodiments described hereabove, preferably, the way in which portion 110A, respectively 110B, of the resonator is fixed to portion 102A, respectively 102B, is, preferably, configured so that portions 110A and 110B of the resonator do not deform during a relative displacement of portions 102A and 102B with respect to each other.

Figure 10:
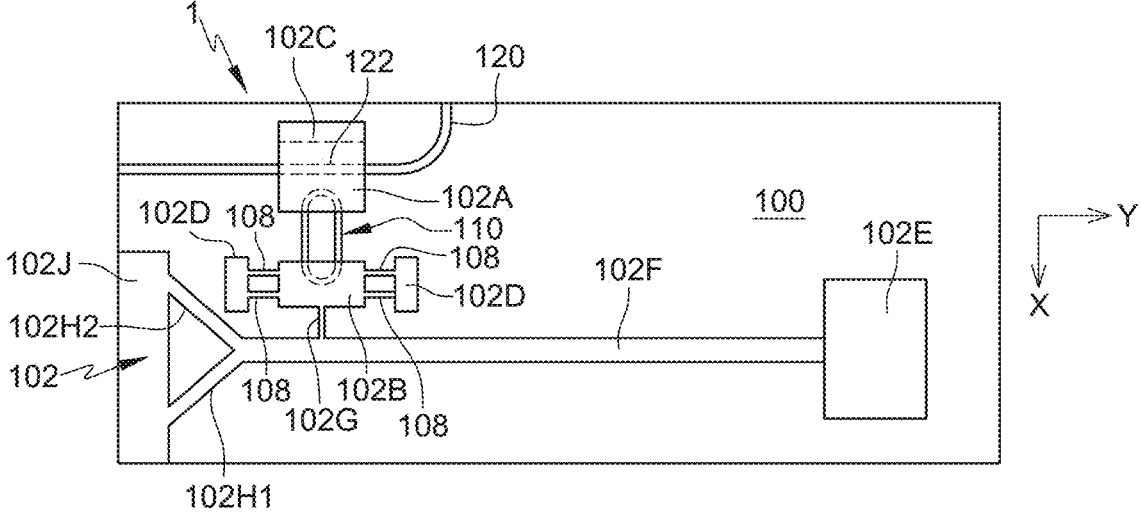
FIG. 10 shows, in a simplified top view, another example of embodiment of the device of FIGS. 1 to 5.

FIG. 10 shows, in a simplified top view, another example of embodiment of device 1.

In this embodiment, preferably, portion 102A of layer 102 is fixed with respect to substrate 100.

In this embodiment, layer 102 of device 1 comprises a portion 102E suspended above substrate 100. Preferably, portion 102E has, in a plane parallel to substrate 100, dimensions greater than those of portion 102B. This portion 102E is mobile with respect to substrate 100 in a plane parallel to substrate 100, for example along a direction identical to direction X of displacement of portions 102A and 102B with respect to each other.

In this embodiment, layer 102 further comprises a lever arm 102F, 102G. Lever arm 102F, 102G is configured so that a displacement of portion 102E in the X direction causes a corresponding, but smaller, displacement of portion 102B in the X direction. Lever arm 102F, 102G is also suspended above substrate 100.

According to an embodiment, arm 102F, 102G is defined in layer 102. As a variant, all or part of lever arm 102F, 102G may be defined in another one of the layers of device 1.

Lever arm 102F, 102G here comprises a beam 102F. In this example, beam 102F is defined in layer 102. Beam 102F extends lengthwise in the Y direction. Beam 102F has an end mechanically connected to portion 102E, and another end fixed with respect to substrate 100. Lever arm 102F, 102G further comprises an element 102G. Element 102G is, in this example, defined in layer 102. The portion of layer 102G has, for example, a beam shape aligned along direction X. Beam 102G is suspended above substrate 100. Beam 102G is mechanically connected to portion 102B and to arm 102F on the side of the fixed end of arm 102F. Portion 102G of layer 102 is configured to transmit the displacements of arm 102F in the X direction to portion 102B of layer 102. As an example, the stiffness of portion 102G in the X direction is at least five times greater than the stiffness of portions 110C of resonator 110 in the X direction.

More particularly, in the example of FIG. 10, beam 102F forms an axis having its end fixed to portion 102 which can rotatably move, in a plane parallel to substrate 100, around the end of the axis which is fixed with respect to the substrate. This rotation of the end of axis 102F which is fixed to portion 102E, that is, the rotation of portion 102E with respect to the fixed end of axis 102F, is locally considered as a translation of portion 102E in the X direction with respect to substrate 100. This rotating motion is transmitted in the form of a translation motion in the X direction to that of portions 102A and 102B which is mobile with respect to substrate 100, via element 102G.

In other words, in the example of FIG. 10, the lever arm is configured to transform a rotating motion, in a plane parallel to the substrate, of portion 102E around the fixed end of axis 102F into a translation motion, still in a plane parallel to the substrate, of portion 102B.

Due to lever arm 102F, 102G, there exists a linear relation coupling a displacement of portion 102E in the X direction and a smaller corresponding displacement of portion 102B in the X direction. Thus, lever arm 102F, 102G enables the displacements of portion 102B in the X direction to remain within a range where the material of portions 110C of resonator 110 is in an elastic deformation mode, while allowing the measurement of the displacement of portion 102E in the X direction and with respect to substrate 100 which are much larger than those of portion 102B in the X direction and with respect to substrate 100. For example, calling Lb the distance between the fixed end of arm 102F and the center of portion 102E, and Lp the distance between the fixed end of arm 102F and the mechanical connection between arm 102F and portion 102G, a displacement of portion 102E in the X direction causes a displacement of portion 102B in the direction which is Lb/Lp times smaller.

As an example, the fixed end of axis or beam 102F is connected to the ends of two beams 102H1 and 102H2, for example defined in layer 102, and forming, in a plane parallel to substrate 100, a right angle therebetween at the level of the fixed end of arm 102F. The other ends of beams 102H1 and 102H2 are mechanically connected to a portion 102J of layer 102 which is fixed with respect to the substrate. Thus, the two beams 102H1 and 102H2 form a ball joint on the fixed end of arm 102F. In the case where such a ball joint is implemented, the torsional stiffness of portion 102G of layer 102 is, preferably, lower than that of the ball joint.

Although there has been described herein the case where lever arm 102F enables for a motion of portion 102E in the X direction to cause a smaller corresponding motion of portion 102B in the X direction, those skilled in the art are capable of providing for lever arm 102F to enable for a motion of portion 102E in the X direction to cause a larger corresponding motion of portion 102B in the X direction.

Further, those skilled in the art are capable of providing other lever arm configurations enabling for a motion, in a plane parallel to substrate 100, of portion 102E with respect to substrate 100 to cause, due to the lever arm, a corresponding motion in this plane of portions 102A and 102B with respect to each other.

More generally, a lever arm designates, in the present description, a system enabling to convert a rotating motion of portion 102E into a translation motion, preferably along the X direction, of that of portions 102A and 102B which is mobile with respect to substrate 100. There has been described hereabove an example in the case where a motion of portion 102E in a plane parallel to substrate 100 is transmitted by lever arm 102F to one of portions 102A and 102B (portion 102B in FIG. 10) to result in a corresponding motion of portions 102A and 102B with respect to each other in the plane. Those skilled in the art will also be capable of providing a device 1 comprising a lever arm configured so that a rotating motion of a portion 102E of layer 102 around an axis parallel to substrate 100 is transmitted in the form of a translation motion corresponding to that of portions 102A and 102B which is mobile with respect to substrate 100. In this case, the motion of portion 102E does not occur in a plane parallel to substrate 100 as is the case in FIG. 10, but at least partly in a direction orthogonal to substrate 100.

As an example, referring again to FIG. 10, by mechanically connecting or by mechanically fixing an edge of portion 102E along beam 102F, and no longer at an end thereof as previously described, and by fixing the end of axis 102F which was previously mobile with respect to substrate 100, portion 102E can then displace with respect to substrate 100 according to a rotating motion around axis 102F, which is fixed and parallel to substrate 100. This rotating motion around an axis parallel to substrate 100, and, more particularly, parallel to axis Y in this example, is then transmitted by element 102G in the form of a corresponding translation motion, in a plane parallel to the substrate, of the portion 102A or 102B which is mobile with respect to substrate 100, for example a translation motion along the X direction. In this case, element 102G for example corresponds to a portion of layer 112, for example in the form of a beam aligned in the X direction, having an end fixed to portion 102A or 102B which is mobile with respect to substrate 100, and another end fixed to portion 102E.

Various embodiments and variants have been described. Those skilled in the art will understand that certain features of these various embodiments and variants may be combined, and other variants will occur to those skilled in the art. In particular, Although there has been described in relation with FIGS. 1, 6, 7, 8, and 9 that the shape of pads 114A, 114B and their connection to the respective portions 110A, 110B of resonator 110 by respective beams 118I, 118B or portions 800 of layer 110 provided with openings are identical for each pads, in alternative embodiments, not illustrated, the two pads 110A and 110B may be different from each other and/or the way in which pad 114A is fixed to portion 110A may be different from that in which pad 114B is fixed to portion 110B. For example, the pads and resonator may be such as illustrated in FIG. 8 as concerns pad 114B and portion 110B of resonator 110, and such as illustrated in FIG. 1 as concerns pad 114A and portion 110A of resonator 110.

Finally, the practical implementation of the described embodiments and variants is within the abilities of those skilled in the art based on the functional indications given hereabove.

The invention claimed is:

1. Device comprising:
   a substrate;
   a first layer resting on the substrate, the first layer comprising a first portion and a second portion mobile with respect to each other;
   a ring-shaped optical resonator defined in a second layer, the resonator comprising a first portion fixed to a first anchor pad connected to the first portion of the first layer and a second portion fixed to a second anchor pad connected to the second portion of the first layer.

2. Device according to claim 1, wherein the first and second anchor pads are arranged inside of the resonator.

3. Device according to claim 1, wherein the first and second portions of the resonator each have a semi-circle shape.

4. Device according to claim 3, wherein:
   the first and second portions of the resonator each have a semi-circle shape;
   the first pad has the shape of a half-disk having its center forming one with the center of the first portion of the resonator and its curved portion facing the first portion of the resonator; and/or
   the second pad has the shape of a half-disk having its center forming one with the center of the second portion of the resonator and its curved portion facing the second portion of the resonator.

5. Device according to claim 4, wherein:
   the first portion of the resonator is fixed to the first pad by first beams defined in the second layer, each of the first beams having a first end connected to the resonator and a second end connected to the first pad; and/or
   the second portion of the resonator is fixed to the second pad by second beams defined in the second layer, each of the second beams having a first end connected to the resonator and a second end connected to the second pad.

6. Device according to claim 5, wherein each of the first and second beams has a larger cross-section area on the side of its second end than on the side of its first end.

7. Device according to claim 1, wherein:
   the first portion of the resonator is fixed to the first pad by a first continuous portion of the second layer, the assembly of the first portion of the resonator, of the first portion of the second layer, and of the first pad having the shape of a half-disk; and/or
   the second portion of the resonator is fixed to the second pad by a second continuous portion of the second layer, the assembly of the second portion of the resonator, of the second portion of the second layer, and of the second pad having the shape of a half-disk.

8. Device according to claim 1, wherein:
   the first portion of the resonator is fixed to the first pad by a first portion of the second layer, the assembly of the first portion of the resonator, of the first portion of the second layer, and of the first pad having the shape of a half-disk, and the first portion of the second layer comprises through openings configured to favor a single optical propagation mode in the first portion of the resonator; and/or the second portion of the resonator is fixed to the second pad by a second portion of the second layer, the assembly of the second portion of the resonator, of the second portion of the second layer, and of the second pad having the shape of a half-disk, and the second portion of the second layer comprises through openings configured to favor a single optical propagation mode in the second portion of the resonator.

9. Device according to claim 1, wherein the resonator comprises a third portion coupling the first portion of the resonator to the second portion of the resonator, and another third portion coupling the second portion of the resonator to the first portion of the resonator, the assembly of the first, second, and third portions forming the ring of the resonator.

10. Device according to claim 9, wherein each of the first and second portions of the resonator has a cross-section configured to allow a multimode guiding of light, and each of the third portions has a central portion having a cross-section configured to allow a monomode guiding of light.

11. Device according to claim 1, wherein the first and second portions of the first layer are mobile with respect to each other in a first direction parallel to the substrate.

12. Device according to claim 1, wherein the second layer is arranged between the substrate and the first layer, the first and second portions of the first layer being suspended above the substrate.

13. Device according to claim 1, wherein the device further comprises a waveguide defined in the second layer and having a portion optically coupled to the resonator, said portion of the waveguide being either optically coupled to the first portion of the resonator and fixed to the first portion of the first layer, or optically coupled to the second portion of the resonator and fixed to the second portion of the first layer.

14. Device according to claim 1, wherein:

the first portion of the first layer is fixed with respect to the substrate;

the first layer further comprises a third portion suspended above the substrate and mobile with respect to the substrate in a plane parallel to the substrate; and the device comprises a lever arm, for example at least partly defined in the first layer, configured so that a displacement of the third portion with respect to the substrate in said plane parallel to the substrate causes a corresponding displacement of the second portion of the first layer with respect to the first portion of the first layer in said plane parallel to the substrate.

15. Device according to claim 1, wherein:

the first portion of the first layer is fixed with respect to the substrate;

the first layer further comprises a third portion suspended above the substrate and rotatably mobile around an axis parallel to the substrate; and the device comprises a lever arm, for example partly defined in the first layer, configured so that a rotation of the third portion around said axis causes a corresponding displacement of the second portion of the first layer with respect to the first portion of the first layer in a plane parallel to the substrate.

* * * * *